(12) United States Patent
Kim et al.

(10) Patent No.: US 9,373,347 B2
(45) Date of Patent: Jun. 21, 2016

(54) DATA WRITE MANAGEMENT

(71) Applicant: Seagate Technology LLC, Cupertino, CA (US)

(72) Inventors: Daniel Suhwan Kim, Gyeonggi-do (KR); Jae Ik Song, Gyeonggi-do (KR); Dong Hyuck Shin, Gyeonggi-do (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 6 days.

(21) Appl. No.: 14/228,354

(22) Filed: Mar. 28, 2014

(65) Prior Publication Data

US 2015/0279395 A1    Oct. 1, 2015

(51) Int. Cl.
*G11B 5/55* (2006.01)
*G11B 5/596* (2006.01)

(52) U.S. Cl.
CPC .......... *G11B 5/5582* (2013.01); *G11B 5/59694* (2013.01)

(58) Field of Classification Search
None
See application file for complete search history.

(56) References Cited

U.S. PATENT DOCUMENTS

| | | | |
|---|---|---|---|
| 8,411,386 B2 | 4/2013 | Hongawa et al. | |
| 8,611,032 B2* | 12/2013 | Champion et al. | 360/31 |
| 8,941,943 B1* | 1/2015 | Coker et al. | 360/75 |
| 8,947,818 B2* | 2/2015 | Nitta et al. | 360/60 |
| 2012/0162806 A1 | 6/2012 | Champion et al. | |

* cited by examiner

*Primary Examiner* — K. Wong
(74) *Attorney, Agent, or Firm* — HolzerIPLaw, PC

(57) ABSTRACT

Implementations disclosed herein provide systems and methods for data write management in a storage device responsive to detection of a disturbance. Responsive to the detection of the disturbance, a write operation is paused and a transducer head is moved from a first position on the target data track to a second position separated from the first position by at least one data track. At the second position, the write operation is resumed.

20 Claims, 7 Drawing Sheets

DATA WRITE MANAGEMENT

BACKGROUND

Disturbances such as impact shock and vibration can be a cause of problems in hard drive disc systems, particularly during write operations. If a disturbance occurs while data is being written to a storage medium, a write element may be knocked off of a target data track. As a result, data may be recorded incorrectly or become corrupted. Disturbances may be caused by a variety of forces, such as a user playing loud music from a laptop computer, vibrations due to cooling fans turning on or off, or external impact forces absorbed by an electronic device.

SUMMARY

Implementations described and claimed herein provide techniques for writing data to a storage medium despite a disturbance that occurs during a write operation.

In one implementation, the disclosed technology provides for detecting a disturbance when a write element is at a first position and writing data of a write operation to a target data track on a storage medium. Responsive to the detection of the disturbance, the write operation is paused, the write element is repositioned, and the write operation is resumed when the write element is at a second position that is separated from the first position by at least one data track.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

As used herein, the term "disturbance" refers to changes affecting an environment within a storage device including, for example, shock, vibration, temperature changes, pressure changes, etc. A disturbance may be caused by forces external or internal to the storage device.

If a disturbance occurs while data is being written to a storage medium, data may be recorded incorrectly or become corrupted. In some recording systems, storage space is statically mapped so that each data block (e.g., a sector) is associated with a logical address assigned by a host computer. In these types of systems, a write operation affected by a disturbance can be retried at the statically mapped location until the write succeeds. However, write retries are time consuming, and may take a full spin period or revolution time of a magnetic media in the storage medium. If the frequency of disturbance-related write errors is large, throughput performance can decrease. These challenges are magnified in shingled magnetic recording (SMR) systems, where a write element may be large enough to affect two adjacent data tracks on a single pass. If the write element is displaced from a target position by vibrations, adjacent tracks on either side of a target track can be affected.

Implementations described herein allow for completion of a write operation without a write retry (e.g., a re-write) to one or more data tracks affected by a disturbance. Although the technology described herein can be utilized in a variety of recording systems types, it may be particularly useful in SMR systems and other types of recording systems with high areal densities where multiple data tracks can be affected by a disturbance.

Figure 1:
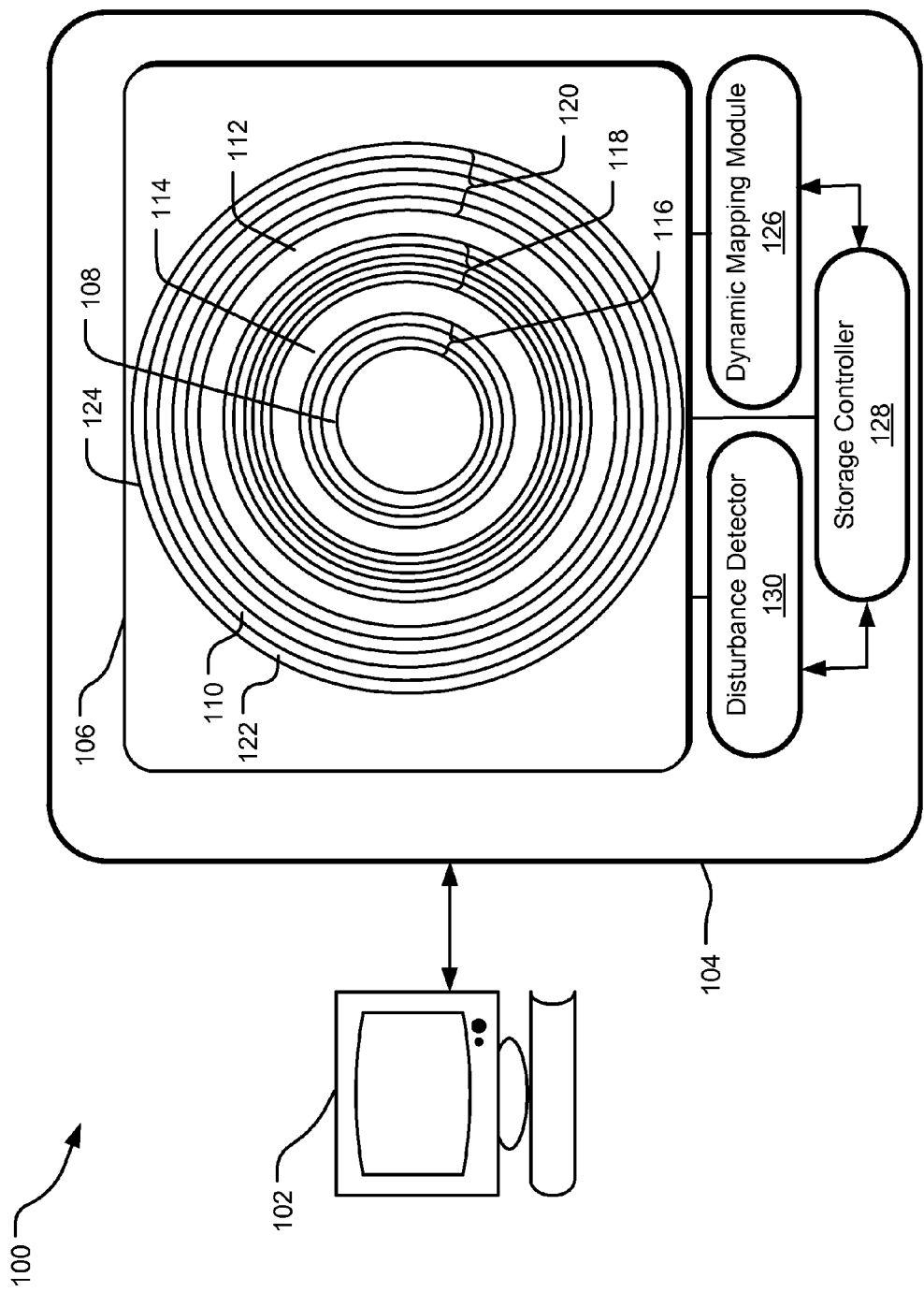
FIG. 1 illustrates an example recording system for writing data when a disturbance is detected.

FIG. 1 illustrates a recording system 100 for managing a data write responsive to detection of a disturbance. The recording system 100 includes a host computer 102 that sends one or more access commands (e.g., read or write commands) to a storage device 104. In some implementations, the storage device 104 is a shingled magnetic recording (SMR) device; however, the storage device 104 may, in other implementations, be any device having a tangible computer-readable storage media (i.e., a storage medium 106). In the implementation of FIG. 1, the storage medium 106 is a shingled magnetic disk drive. However, in various implementations, the storage medium 106 may be one or more of a variety of tangible computer-readable media excluding carrier waves and communication signals. The storage medium 106 may be, for example, one or more magnetic storage disks, solid state drives, flash memory optical storage disks, random access memories (RAMs) read only memories (ROMS), and the like.

The storage medium 106 has a number of concentric data tracks (e.g., a data track 110) extending between an inner diameter (ID) 108 and an outer diameter (OD) 124. Each of the concentric data tracks includes plurality of data regions or cells on which data can be stored. Isolation regions (e.g., isolation regions 112 and 114) separate groupings of adjacent data tracks, referred to as "data bands" (e.g., data bands 116, 118, and 120). Data may be stored within each of the data bands.

In the recording system 100, data can be written to data cells on the storage medium 106 using a write element on a transducer head (not shown). In some implementations, such as where the storage device 104 is an SMR recording device, the write element may generate a magnetic field strong enough to affect two adjacent data tracks at one time. Consequently, a write operation directed at a data track 122 can incidentally affect or corrupt data on an adjacent data track 110. Therefore, in order to change any data cell within a data band (e.g., the data band 120), all of the other data in the data band is re-written to the data band in a selected sequential write order. The isolation regions (e.g., the isolation regions 112 and 114) are groupings of one or more guard tracks that separate the data bands from one another to prevent overwrite between adjacent data bands. No data is written to the isolation regions.

The recording system 100 includes a disturbance detector 130, which is a mechanism that disturbances. In one implementation, the disturbance detector 130 is a vibration sensor that monitors vibrations within the storage media 106. A disturbance may cause the vibration sensor to detect a vibration that exceeds a threshold limit. In another implementation, the disturbance detector 130 includes firmware of the storage device 104 that generates a position error signal (PES) that indicates whether a disturbance has affected a position of a transducer head. For example, the disturbance detector 130 may generate a PES for each sector of a magnetic media based on a servo pattern read from the sector. Therefore, the disturbance detector 130 may detect a disturbance when, for example, a vibration or a positioning measurement exceeds a predetermined threshold. Other methods of disturbance detection, such as temperature and pressure detection, are also contemplated.

The term "disturbance position" refers to a position of the transducer head at the time that a disturbance is detected. When the system 100 detects a disturbance, the disturbance position is saved for use in a dynamic mapping process. Responsive to detection of the disturbance, a controller 128 of the storage device 104 pauses the write operation and initiates a seek operation that moves the transducer from the disturbance position on a target data track of the write operation to a second position on another data track. In one implementation, the new position is on a data track that is closer to the inner diameter (ID) 108 of the storage medium 106 than the target data track. For example, the transducer head may be moved from an outer data track in the data band 118 to an inner data track in the data band 118. In another implementation, the transducer head is moved such that a data track is "skipped" between the disturbance position on the target data track and the new position on a different data track. At the new position of the transducer head, the write operation is resumed.

Data of the write operation is dynamically mapped from a first target location to a new location that accounts for the repositioning of the transducer head. To allow for this remapping of data from one data track to another, a dynamic mapping module 126 updates a key (e.g., a sector allocation tree, other table, log file etc.) to associate original addresses of the first target location to the new remapped addresses. In the above-described manner, the recording system 100 can complete a write operation affected by a disturbance without performing a re-write of an affected data track. In some systems, such as SMR systems, remapping to "skip" one or more data tracks improves data integrity and reduces the total time duration of the write operation.

Figure 2:
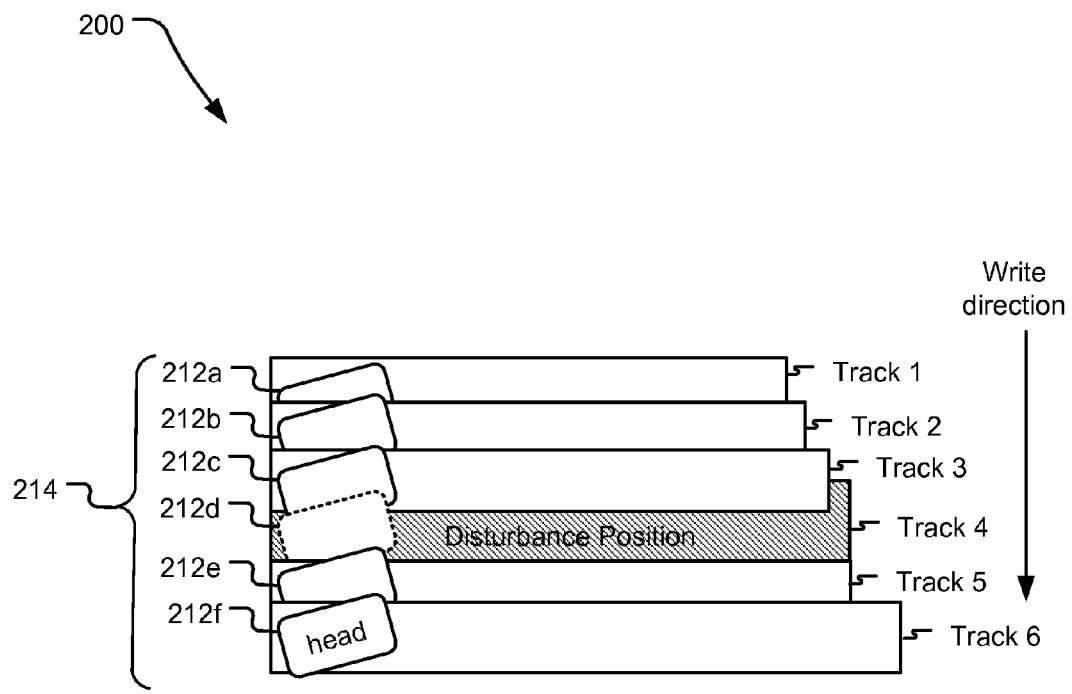
FIG. 2 illustrates a recording system for managing an example data write responsive to detection of a disturbance.

FIG. 2 illustrates a recording system 200 for managing an example data write responsive to detection of a disturbance. The recording system 200 is an SMR system including a magnetic media with a number of tightly packed concentric data tracks (e.g., Tracks 1-6) positioned between in an inner diameter and an outer diameter of a magnetic media. The data tracks shown belong to a single data band 214 on the magnetic media.

Tracks 1-6 may be written to consecutively in a continuous write operation. A continuous write operation is a write operation where consecutive data blocks are written to in order such that a seek operation is not used to lift and reposition the transducer head at any time after the write operation begins until the write operation ends. In contrast, a non-continuous write operation is one that entails one or more interim seek operations to reposition the transducer head.

The magnetic media of the recording system 200 rotates about an axis below the transducer head. Various positions of the transducer head 212a, 212b, 212c, 212d, 212e, and 212f are shown, indicating various phases of a continuous write operation. The transducer head includes a write element that generates a magnetic field large enough to affect two consecutive data tracks on a single pass. Therefore, when writing data to Track 1 from the position 212a the transducer head incidentally magnetizes some data bits on an adjacent data track (i.e., Track 2). These incidentally magnetized bits are corrected on the next pass of the transducer head, at the position 212b, when data is written to Track 2. However, as data is written to Track 2, some data bits on Track 3 are incidentally magnetized. These incidentally magnetized bits are corrected on the subsequent pass of the transducer head, at the position 212c, and so on.

During a write operation, a write element on the transducer head writes data to consecutive tracks, Track 1, Track 2, and Track 3. Prior to writing data to a first sector of Track 4, a disturbance detector (not shown) detects a disturbance. For example, the recording system 200 may finish a write of Track 3 and the disturbance detector may check a PES prior to beginning the write of Track 4. A disturbance is detected when the PES exceeds a predetermined threshold. Responsive to detection of the disturbance, the recording system 200 pauses the write operation and moves the transducer head from the disturbance position 212d to the position 212e associated with the beginning of Track 5. Data originally associated with the target data track (i.e., Track 4) is written instead to Track 5.

After finishing the write to Track 5, the disturbance detector detects that the disturbance has stopped. For example, the disturbance detector may detect that vibrations within the recording system 200 have reduced to an acceptable level, below the predetermined threshold. In response, the recording system 200 continues to write data to Track 6 and to any other consecutive other data tracks (not shown) that are also included in the same data band 214. Because Track 4 was "skipped," data originally associated with Track 4 is now stored in Track 5, and data originally associated with Track 5 is stored in Track 6.

In another implementation, the vibrations within the system do not reduce to below the predetermined threshold by the time that the write to Track 5 is complete. In this case, the recording system 200 continues the write operation by skipping over Track 6 and repositioning the write element on the next adjacent data track (e.g., a Track 7, not shown). In this manner, the recording system 200 writes data on alternating data tracks (e.g., every-other data track) so long as the vibrations continue to persist above the threshold.

To enable data retrieval (e.g., subsequent read back) of the data in the data band 214, Virtual Block Addresses (VBAs) associated with each of Tracks 1-6 are dynamically re-mapped. For example VBAs originally associated with physical data blocks of Track 4 are, through a re-mapping process, associated with physical data blocks of Track 5. This mapping information is stored in a storage location readily accessible by the recording system 200, such as in a non-volatile memory storage location. For example, mapping of VBAs can be managed in a log file (e.g., a table) or other file stored on the magnetic media or otherwise accessible to the recording system into track 212. In one implementation, mapping of VBAs is tracked in a dynamic mapping table, managed by firmware of the recording system 200, and stored in a non-volatile memory location such as a the magnetic media or flash memory.

Figure 3:
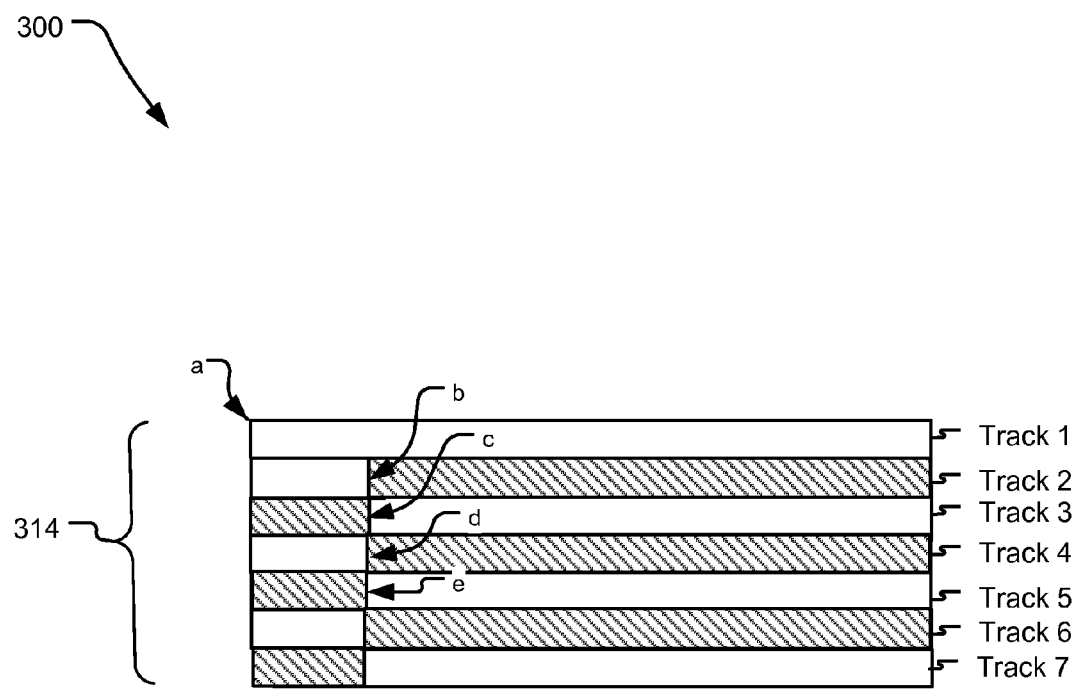
FIG. 3 illustrates a recording system for managing an example data write responsive to detection of a disturbance.

FIG. 3 illustrates a recording system 300 for managing an example data write responsive to detection of a disturbance. The recording system 300 is an SMR system including a magnetic media with a number of tightly packed concentric data tracks (e.g., Tracks 1-7) positioned between an inner diameter and an outer diameter of a magnetic media. The data tracks shown are all associated with the same data band 314. Either end of the data band 314 may be adjacent to one or more guard tracks (not shown).

In the example write operation illustrated, the transducer head writes data to Track 1 and then begins writing data to the subsequent data track, Track 2. When the transducer head reaches a position labeled 'b' within Track 2, a disturbance is detected. For example, the disturbance may cause vibrations in the recording system 300 to exceed a predetermined threshold or generate a positioning error in excess of a set magnitude.

Responsive to the detection of the disturbance, the transducer head is moved to a position 'c', which is closer to an inner diameter of the magnetic media than the disturbance position 'b' and separated from the disturbance position 'b' by one full data track. The write operation is resumed starting from the position 'c' on Track 3.

After writing data continuously between positions 'c' and 'd', the recording device 300 determines that the disturbance is continuing. For example, the recording device 300 may determine that vibrations detected within the storage device have not yet dropped below the predetermined threshold. The recording system 300 again repositions the transducer head to skip over another full data track between position 'd' and position 'e.' The write operation is resumed at a position 'e'. In this manner, the write operation continues, writing data to every-other data track until the end of the write operation or until the disturbance detector determines that the disturbance has stopped (e.g., is no longer detectable above some threshold).

When the disturbance stops affecting the recording system 300, the recording system resumes a continuous write pattern, writing data to each consecutive data track in the data band 314.

Figure 4:
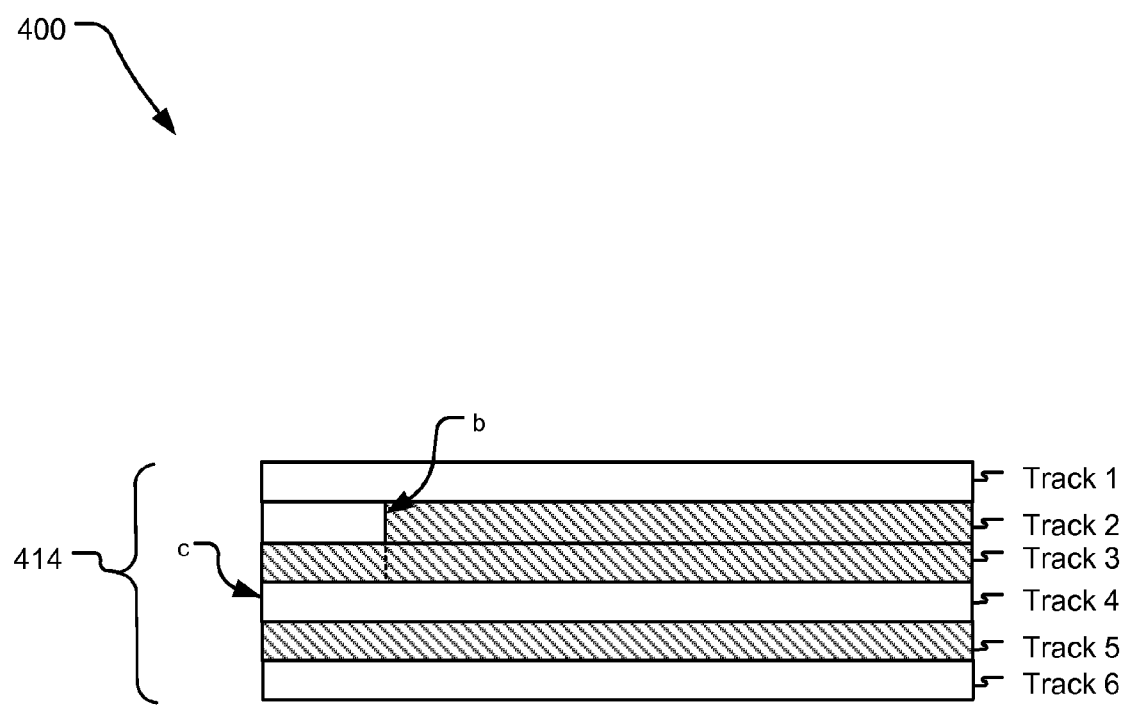
FIG. 4 illustrates a recording system for managing an example data write responsive to detection of a disturbance.

FIG. 4 illustrates a recording system 400 for managing an example data write responsive to detection of a disturbance. The recording system 400 is an SMR system including a magnetic media with a number of tightly packed concentric data tracks (e.g., Tracks 1-6) positioned between in an inner diameter and an outer diameter of a magnetic media. The data tracks shown are all associated with the same data band 414. Either end of the data band 414 may be adjacent to one or more guard tracks (not shown).

In the example write operation of FIG. 4, the transducer head writes data to Track 1 and then begins writing data to the subsequent data track, Track 2. When the transducer head reaches a position labeled 'b' within Track 2, a disturbance is detected. For example, the disturbance may be detected when vibrations or a positioning error are measured in the recording system 400 in excess of predetermined threshold.

Responsive to detecting the disturbance, the transducer head is moved to a position 'c', which is closer to an inner diameter of the magnetic media than the disturbance position 'b' and separated from the disturbance position 'b' by slightly more than one full data track. The write operation is resumed starting from the position 'c' at the beginning of data track 4.

Resuming a write operation at the beginning of a data track, as shown in FIG. 4, may allow for easier address remapping than resuming the write operation at a position that is not the beginning of a data track (e.g., the position 'c' in FIG. 3) due to considerations regarding skew angle and other physical factors.

After writing data to Track 4, the recording system 400 determines that the disturbance persists. For example, a positioning error may be generated, or vibrations within the storage device may continue to be detected above the predetermined threshold level. The recording system 400 continues the write operation by skipping over Track 5. The transducer head is repositioned at the beginning of Track 6, where the write operation is resumed. The write operation continues, writing data to every-other data track until the end of the write operation, or until the vibrations drop below the predetermined threshold. If the vibrations drop below the predetermined threshold prior to the end of the write operation, the recording system resumes a continuous write pattern, writing data to each consecutive data track in the data band 514.

A dynamic mapping table (not shown) tracks the mapping of data from each original, target VBA to a next available VBA, accounting for various VBAs "skipped over" each time that the transducer head is repositioned.

Figure 5:
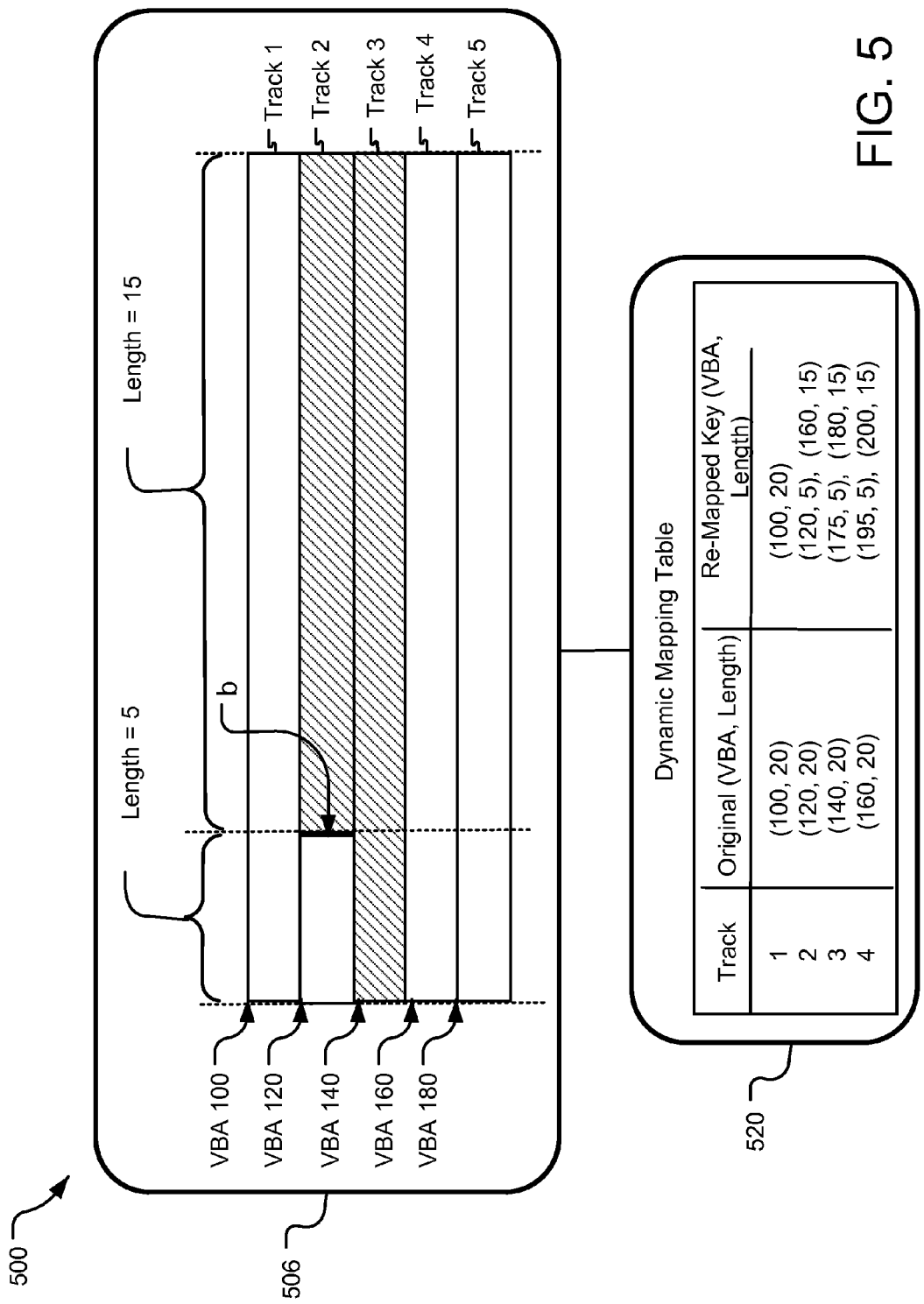
FIG. 5 illustrates another recording system for managing an example data write responsive to detection of a disturbance.

FIG. 5 illustrates a recording system 500 for managing an example data write responsive to detection of a disturbance. The recording system 500 is a SMR system including a magnetic storage medium 506 and a dynamic mapping module that creates a dynamic mapping table 520. Although only a portion of the storage medium 506 is shown, the storage medium 506 includes a number of tightly packed concentric data tracks (e.g., Tracks 1-5).

Virtual block addresses (VBAs) 100, 120 140, 160, and 180 are associated with a first sector each of Tracks 1-5, respectively. Each data track illustrated has a total length of 20 sectors; however, the track lengths shown are meant to be exemplary and may vary from one implementation to another.

In the example write operation illustrated, the transducer head writes data to the Track 1 and then begins writing data to the subsequent Track 2. The recording device 500 writes data to the first five sectors of the Track 2. At the start of the sixth sector (i.e., at a position labeled "b") a disturbance is detected. Responsive to the detection of the disturbance, the transducer head is moved to the first sector of the Track 4, where the write operation is resumed.

A dynamic mapping table 520 (e.g., a sector allocation tree) is updated to track data affected by the repositioning of the transducer head. In FIG. 5, data associated with VBAs 120-124 in Track 2 is unaffected by the disturbance; however, data originally associated with VBAs 125-159 is affected because these VBAs were "skipped" and left blank. The data originally associated with each of target VBAs 125-159 of Tracks 2 and 3 is mapped to a location that is 35 VBAs forward of the target VBA (e.g., 15 VBAs are skipped in Track 2 and 20 VBAs skipped in Track 3). Accordingly, the updated dynamic mapping table 520 indicates that the last 15 VBAs of Track 2 have been remapped to the first 15 VBAs of Track 4 (e.g., starting with VBA 160). Similarly, data originally associated with each VBA in Tracks 2, 3, and 4 is also moved ahead by 35 VBAs. Other methods for remapping are also contemplated.

Figure 6:
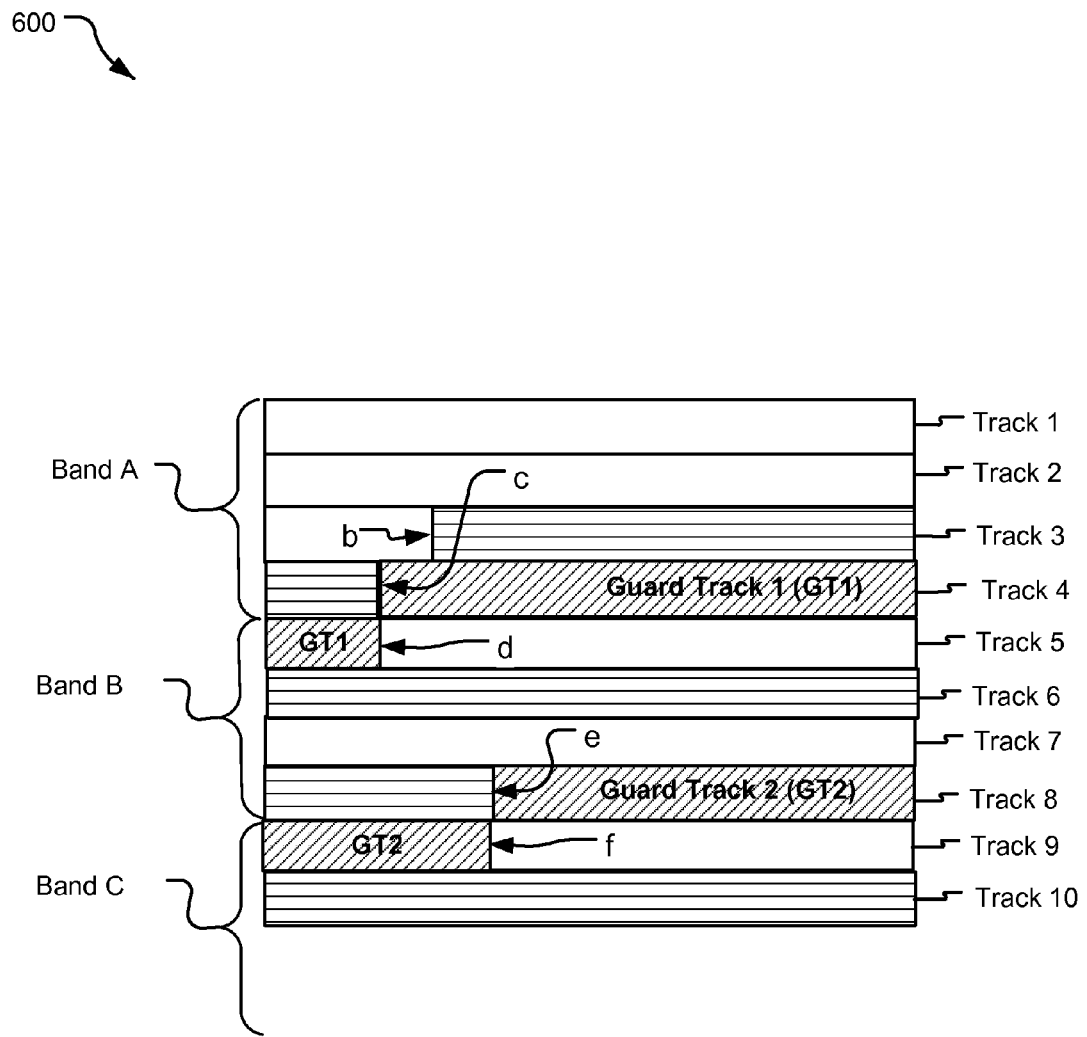
FIG. 6 illustrates yet another recording system for managing an example data write responsive to detection of a disturbance.

FIG. 6 illustrates another recording system 600 for managing an example of a data write responsive to detection of a disturbance. The recording system 600 is an SMR system including a magnetic media with a number of tightly packed concentric tracks (e.g., Tracks 1-10) belonging to different logical bands (e.g., Band A, Band B, and Band C). The logical band may be consecutive or nonconsecutive physical bands on the magnetic media. Each logical band includes data tracks that are allocated for data storage, and is bounded on opposite sides by a guard track, (e.g., Guard Track 1 and Guard Track 2) where no data is stored. The logical bands may be equal or unequal in size to one another.

In some implementations, each of the logical bands includes a set number of data tracks. In FIG. 6, each of the logical bands equals a set number of bytes, which does not divide evenly into full data tracks. For example, Band A starts at the beginning of Track 1 and ends at a point 'c' on Track 4.

Band A is separated from Band B by a guard track that spans part of Track 4 and part of Track 5. Band B starts at point 'd' and ends at point 'e,' and Band B is separated from Band C by another guard track that spans part of Track 8 and part of Track 9. Guard Track 1 and Guard track 2 are statically mapped and thus span fixed locations on the magnetic media.

In the example write operation illustrated, each of Bands A, B, and C represents an empty band that does not yet contain any data. The transducer head writes data to Track 1 and then begins writing data to Track 2. When the transducer head reaches a position 'b' within Track 3, a disturbance is detected. Responsive to detection of the disturbance, the recording system 600 moves the transducer head from the disturbance position 'b' to a next available write position that is separated from position 'b' by at least one full data track. In this case, the transducer head cannot resume the write operation at a position exactly one full data track away (e.g., at a position 'c') because this position corresponds to the location of Guard Track 1. Instead, the transducer head resumes the write operation at the next available write location after Guard Track 1, which is a point 'd' in Track 5.

After writing data between point 'd' and the end of Track 5, the recording system 600 determines that the disturbance persists. For example, the disturbance may persist if vibrations within the storage device have not yet dropped below the predetermined threshold level or a PES continues to be above a threshold. The transducer head is repositioned at a next available write position that is separated from the end of Track 5 by at least one full data track. This position is at the start of Track 7, where the write operation is resumed.

After writing data to Track 7, the system 600 again determines that the disturbance persists. Again, the transducer head is repositioned to a next available write location that is separated from the end of Track 7 by at least one full data track. In this case, the beginning of Track 9 is separated from the end of Track 7 by one full data track. However, the beginning of Track 9 forms part of Guard Track 2, and is thus unavailable for the write operation. Therefore, the transducer head is moved ahead to point 'f' in Track 9, which is the next available write position after Guard Track 2.

After writing data between point 'f' and through the end of Track 9, the system 600 again determines that the disturbance continues to affect positioning of the transducer head. The transducer head is repositioned at a next available write position that is separated from the end of Track 9 by at least one full data track. In this manner, the recording system continues writing data on alternating available data tracks (excluding guard tracks) until the write operation is complete, or until the disturbance ceases to exist.

Completing a write operation in this "disturbance-free" manner can reduce total write time in the presence of a disturbance by eliminating a need to re-write one or more data tracks. In addition, this write method reduces a risk of data overwrite on adjacent tracks by effectively writing a section of non-shingled data while the disturbance persists.

Although the disclosed method and systems for disturbance-free writing have numerous benefits including those benefits described above, write operations performed in this manner consequentially leave some space unused (e.g., skipped data tracks). To limit the amount of unused space in each data band, a cap may be set on the amount of unused space that is skipped over by the transducer head. For example, a transducer head in an SMR system may be permitted to write a data band by skipping up to 20% of the total capacity of that data band. If this cap of 20% is reached and a disturbance persists, the storage device may switch to a "retry" method, in which the write element re-tries a write to a data track when a disturbance is detected.

Figure 7:
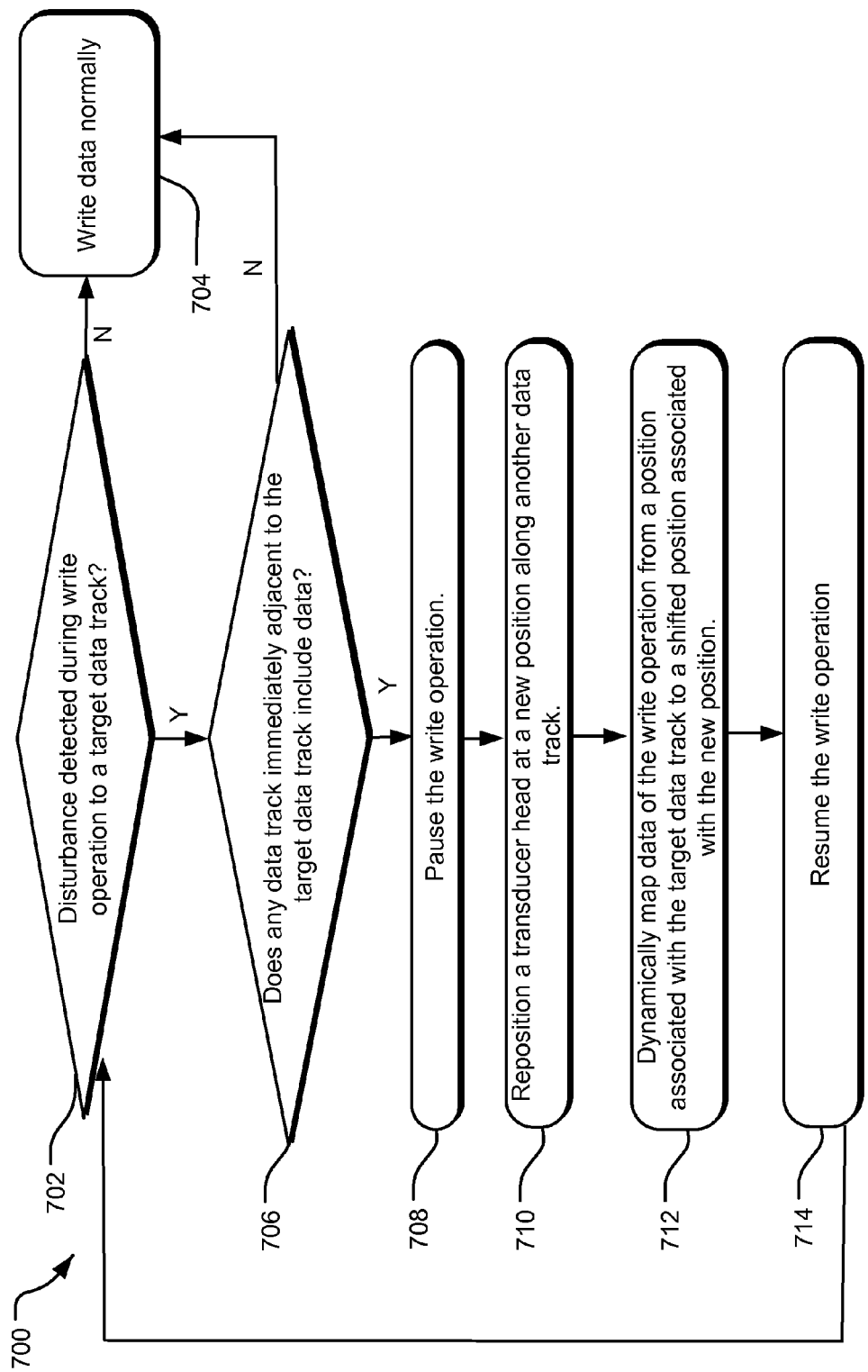
FIG. 7 illustrates example operations for managing a data write responsive to detection of a disturbance.

FIG. 7 illustrates example operations 700 for managing an example data write responsive to detection of a disturbance in a recording system. A first detection operation 702 determines whether a disturbance is affecting a write operation of the recording system. For example, a disturbance may affect current write operation when vibrations in the recording system exceed a predetermined threshold, or when vibrations cause a positioning error in excess of a predetermined magnitude. If a disturbance is not detected, a write operation 704 continues to write data normally, in a continuous data write of consecutive data tracks on a storage medium. In this case, data is written to addresses assigned by a host computer.

If, at any time during the write operation, a disturbance is detected, a determination operation 706 determines whether any data is stored on a data track immediately adjacent to the target data track. This data is at a risk of being erased or overwritten by vibrations of the disturbance.

If no data track immediately adjacent to the target data track includes data, the write operation 704 continues to write data normally. However, if a data track immediately adjacent to the target data track does include data, a pausing operation 708 pauses the write operation, and a repositioning operation 710 repositions the transducer head at a new position along another data track. In one implementation, the new position is separated from the disturbance position by at least one full data track. In the same or another implementation, the new position is a next available write position that is separated from the disturbance position by at least one full data track. If, for example, the disturbance position is a first sector in a data track, the transducer head may be moved toward the inner diameter of the storage medium by one full data track.

In performing the repositioning operation 710, one or more data tracks may be "skipped" over and left blank. A dynamic mapping operation 712 re-maps the data from original address locations assigned by a host computer to new address locations associated with the new position of the transducer head. A write resuming operation 714 resumes the write operation at the new position of the transducer head.

Periodically, during the write operation, the system 700 repeats the detection operation 702. If the disturbance is no longer detected, the write operation 704 resumes a normal pattern of data write by writing data to each consecutive data track. If it is determined that the disturbance continues to affect a position of the transducer head, operations 706-714 repeat until the write operation completes or the detection operation detects that the disturbance is no longer occurring.

The implementations of the technology described herein are can be implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary implementations of the disclosed technology. Since many implementations can be made without departing from the spirit and scope of the invention, the invention resides in the claims hereinafter appended.

What is claimed is:

1. A method comprising:
   detecting a disturbance when a write element is at a first position and writing data of a write operation to a target data track on a storage medium;
   responsive to the detection operation, pausing the write operation;
   modifying the write operation to direct data to a series of alternating data tracks so long as the disturbance persists above a predetermined threshold;
   repositioning the write element; and
   resuming the write operation when the write element is at a second position separated from the first position by at least one data track.

2. The method of claim 1, further comprising:
   dynamically mapping the data associated with the first position to the second position.

3. The method of claim 1, wherein the disturbance is a vibration caused by a force external to the storage medium.

4. The method of claim 1, wherein the second position is closer to an inner diameter of the storage medium than the first position.

5. The method of claim 1, wherein the second position is on a data track directly adjacent to the target data track.

6. The method of claim 1, wherein the second position is separated from the first position by one data track and one guard track.

7. The method of claim 1, wherein the storage medium is a shingled magnetic recording (SMR) medium.

8. The method of claim 1, wherein the write operation is completed without performing a write retry of any data track.

9. The method of claim 1, further comprising:
   detecting the disturbance at a subsequent time during the write operation;
   pausing the write operation responsive to the detection at the subsequent time; and
   resuming the write operation when the write element is at a third position, the third position separated from the second position by at least one data track.

10. A recording system comprising:
    a disturbance module configured to detect a disturbance when a write element is at a first position and writing data of a write operation to a target data track on a storage medium;
    a controller configured to modify the write operation to direct data to a series of alternating data tracks so long as the disturbance persists above a predetermined threshold and to reposition the write element responsive to the detection of the disturbance; and
    a dynamic mapping module configured to dynamically map data from a location associated with the first position to a shifted location associated with a second position, the second position being closer to an inner diameter of the storage medium than the first position.

11. The recording system of claim 10, wherein the second position is separated from the first position by at least one data track.

12. The recording system of claim 10, wherein the second position is on a data track adjacent to the target data track.

13. The recording system of claim 10, wherein the second position is separated from the first position by at least one guard track.

14. The recording system of claim 13, wherein the write operation is a continuous write operation to a plurality of consecutive data tracks.

15. The recording system of claim 10, wherein the storage medium is a shingled magnetic recording (SMR) medium.

16. A recording device comprising:
    a processor configured to:
    detect a vibration during a write operation to a plurality of consecutive data tracks, the vibration of a magnitude that exceeds a predetermined threshold; and
    responsive to the detection of the vibration, modify the write operation so that data is not written to alternating data tracks in the plurality of consecutive data tracks until the vibration is of a magnitude that does not exceed the predetermined threshold.

17. The recording device of claim 16, wherein the processor is further configured to:
    detect that the vibration no longer exceeds the predetermined threshold; and
    modify the write operation so as to write data to each of the remaining data tracks in the plurality of consecutive data tracks.

18. The recording device of claim 16, wherein the processor is further configured to:
    determine that an amount of space included in the alternating data tracks exceeds a predetermined cap.

19. The recording device of claim 18, wherein the processor is further configured to:
    retry a data-write to at least one data track responsive to the determination operation.

20. The recording device of claim 16, wherein the recording device is a shingled magnetic recording device.

* * * * *